United States Patent [19]

Gray et al.

[11] Patent Number: 4,923,633
[45] Date of Patent: May 8, 1990

[54] LIQUID CRYSTAL COMPOUNDS CONTAINING TWO OR MORE CHIRAL CENTERS

[75] Inventors: George W. Gray; David Lacey; Kenneth J. Toyne, all of North Humberside; David Coates, Hertfordshire; Adam Jackson; Richard M. Scrowston, both of North Humberside, all of England

[73] Assignee: The Secretary of State for Defence in Her Britannic Majesty's Government of the United Kingdom of Great Britain and Northern Ireland, London, England

[21] Appl. No.: 116,282

[22] Filed: Nov. 30, 1987

Related U.S. Application Data

[63] Continuation of PCT GB87/00058 filed Jan. 28, 1987, published as WO87/04705.

[30] Foreign Application Priority Data

Jan. 29, 1986 [GB] United Kingdom ................ 8602168

[51] Int. Cl.⁵ .................... C07C 69/76; C07C 69/84; C09K 19/12; C09K 19/20
[52] U.S. Cl. .......................... 252/299.65; 252/299.01; 252/299.64; 252/299.66; 252/299.63; 252/299.61; 252/299.62; 560/59; 560/66; 560/102

[58] Field of Search ...................... 252/299.01, 299.64, 252/299.65–299.66; 350/350 S; 560/59, 66

[56] References Cited

U.S. PATENT DOCUMENTS 4,852,977 8/1989 Chan et al. ..................... 252/299.66

Primary Examiner—John F. Terapane
Assistant Examiner—J. E. Thomas
Attorney, Agent, or Firm—Stevens, Davis, Miller & Mosher

[57] ABSTRACT

A compound suitable for use in a ferroelectric smectic liquid crystal composition having a structure which contains two chiral centers derived from alpha hydroxy carboxylic acid groups and having the formula:

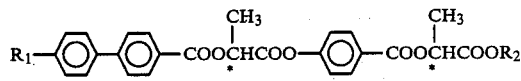

wherein $R_1$ is n-alkoxy containing 1–12 carbo atoms and $R_2$ is n-alkyl containing 1–12 carbon atoms. Methods of preparation and details of liquid crystal mixtures containing these compounds are described.

6 Claims, 8 Drawing Sheets

Route D

LIQUID CRYSTAL COMPOUNDS CONTAINING TWO OR MORE CHIRAL CENTERS

This application is based on a PCT application filed Jan. 28, 1987 under PCT/GB87/00058, and a British Application filed Jan. 29, 1986 under number 1986/02168.

The present invention relates to compounds suitable for use in liquid crystal mixtures and devices.

In particular the invention relates to ferroelectric liquid crystal materials, which show a tilted chiral smectic liquid crystal mesophase. Such materials have been proposed for use in rapidly switched electro-optical devices, for example processing and storage devices and displays, based on the ferroelectric properties of the material in the tilted chiral smectic phase, eg as described by N A Clark and S T Lagerwall in 'App Phys Lett' 36 P899, (1980) (Reference 1).

A measure of the effectiveness of a ferroelectric liquid crystal material is its spontaneous polarisation coefficient Ps. It is desirable to have as high a Ps as possible in a ferroelectric liquid crystal material for electro-optical applications, whilst also combining this high Ps with the other desirable properties generally sought in liquid crystal materials eg low viscosity, broad liquid crystal phase range, stability etc. The tilted smectic phases which exhibit ferroelectric behaviour are the chiral C, F, G, H, I, J and K phases (designated hereinafter as $S^*_C$, $S^*_F$ etc, the asterisk indicating chirality). The $S^*_C$ phase is most commonly sought as this is the most fluid. It is also desirable that the liquid crystal material shows an $S_A$ phase at a temperature above its $S^*$ phase, as this assists surface alignment in the device.

Although some compounds show $S^*$ liquid crystal phases embodying many of the desirable properties outlined above, it is normal in practice to use a composition which is a mixture of compounds which shows an $S_C$ phase and which includes at least one optically active compound which induce(s) the $S_C$ phase to become chiral. Such optically active compounds are termed 'chiral dopants'.

A number of chiral dopants are known which are effective at inducing a high Ps in a smectic host, for example the α-hydroxy carboxylic acid derivatives described in PCT Application PT/GB85/0512, and the amino acid derivatives and terpenoid derivatives described in the Applicants co-pending patent applications GB 8620111 and PCT/GB86/0046.

It is an object of the present invention to provide a range of liquid crystal materials having improved properties relative to known materials. Other objects of the present invention will become apparent from the following description.

According to the present invention in a first aspect, there is provided a compound suitable for use in a ferroelectric liquid crystal composition, the compound having a structure which contains at least two chiral groups independently selected from the following:

(1) optically active groups derived from α-hydroxy carboxylic acid groups,
(2) optically active groups derived from amino acids,
(3) optically active groups derived from secondary alcohols,
(4) optically active cyclic groups derived from naturally occurring terpenoids.

Chiral group (1) preferably has the structure (1A):

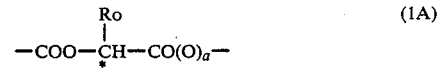

wherein Ro represents alkyl, or optionally substituted phenyl.

Chiral group (2) preferably has the structure (2A, 2B or 2C)

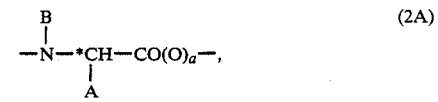

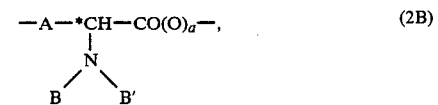

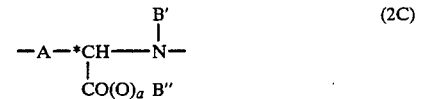

wherein B, B' and B'' are groups which contain no hydrogen atoms likely to engage in strong hydrogen bonding or to be lost as a proton (but B may be hydrogen), A represents a residue of a naturally occurring α-amino acid in which all hydrogen atoms in NH, $NH_2$, $CO_2H$, or OH groups in the residue other than those involved in bonding to A have been converted into NB, NB' or NBB', $CO_2B'$ or OB' units and where a may be 0 or 1

Chiral group (3) preferably has the structure (3A)

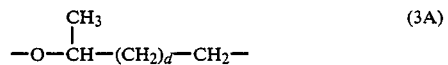

where d is in the range 1 to 10.

Ro is preferably n-alkyl containing 1–5 carbon atoms, especially methyl (ie lactic acid derivatives), or unsubstituted phenyl (ie mandelic acid derivatives). The substituents on the phenyl ring may be one or more alkyl, alkoxy, halogen, CFs or cyano groups.

B, B' and B'' may be all the same or different. NB and NB' units may be N-alkyl, ie amines, or N-acyl, ie amides. $CO_2B''$ units may be $CO_2$-alkyl esters, and OB units may also be O-CO-alkyl esters. When B, B' or B'' are organic they preferably contain 1–5 carbon atoms, when alkyl they are preferably methyl or ethyl.

A may be any of the residues of the known naturally occurring optically active amino acids, for example those listed in table 1. For example in the case of the amino-acid α-alanine (4)

A is methyl, and in the case of aspartic acid, HOOC—$CH_2$—CH—($NH_2$) $CO_2H$, A is $CH_2$—$CO_2H$. A for each of the listed acids is given in table 1.

Terpenoids may be monoterpene (2 isoprene units), sesquiterpenoids (3 isoprene units), diterpenoids (four isoprene units), and triterpenoids (six isoprene units) Terpenoids may be monocyclic, bicyclic or tricyclic.

Not all terpenoids are chiral, and of those that are, monoterpenoids, bicyclic monoterpenoids and tricyclic sesquiterpenoids are preferred.

Examples of chiral monocyclic monoterpenoid alcohols are menthol, neomenthol, isomenthol, neoisomenthol, carveol, dihydrocarveol, terpinen-4 ol, α-terpineol, and limonen-10 ol.

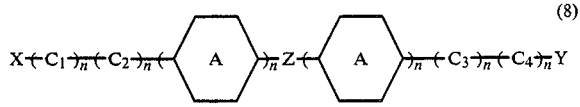

(8)

wherein each

TABLE 1

Naturally occuring α-Amino Acids.

| Name | Formula | Residue A |
|---|---|---|
| Glycine | $H_2N-CH_2-CO_2H$ | H |
| α-Alanine | $CH_3-CH(NH_2)CO_2H$ | $CH_3$ |
| Serine | $CH_2OHCH(NH_2)CO_2H$ | $CH_2OH$ |
| Valine | $CH_3-CH-(CH_3)CH(NH_2)CO_2H$ | $(CH_3)_2CH$ |
| Threonine | $CH_3-CH(OH)CH(NH_2)CO_2H$ | $CH_3-CHOH$ |
| Cysteine | $HSCH_2CH(NH_2)CO_2H$ | $HSCH_2$ |
| Leucine | $CH_3CH(CH_3)CH_2CH(NH_2)CO_2H$ | $(CH_3)_2CHCH_2$ |
| Isoleucine | $CH_3-CH_2CH(CH_3)CH(NH_2)CO_2H$ | $CH_3-CH_2-CH(CH_3)$ |
| Methionine | $CH_3SCH_2CH_2CH(NH_2)CO_2H$ | $CH_3SCHCH_2$ |
| Phenylalanine | Ph–$CH_2CH(NH_2)CO_2H$ | Ph–$CH_2$ |
| Tyrosine | HO–Ph–$CH_2CH(NH_2)CO_2H$ | HO–Ph–$CH_2$ |
| Tryptophan | indolyl–$CH_2CH(NH_2)CO_2H$ | indolyl–$CH_2$ |
| Aspartic Acid | $HOOCCH_2CH(NH_2)CO_2H$ | $HOOC-CH_2$ |
| Glutamic Acid | $HOOC-CH_2CH_2CH(NH_2)CO_2H$ | $HOOC-CH_2CH_2$ |
| Asparagine | $H_2NCOCH_2CH(NH_2)CO_2H$ | $H_2NCOCH_2$ |
| Glutamine | $H_2NCO(CH_2)_2CH(NH_2)CO_2H$ | $H_2NCO(CH_2)_2$ |
| Ornithine | $H_2N(CH_2)_3CH(NH_2)CO_2H$ | $H_2N(CH_2)_3$ |
| Lysine | $H_2N(CH_2)_4CH(NH_2)CO_2H$ | $H_2N(CH_2)_4$ |
| Arginine | $HN=C(NH_2)NHCH_2CH_2CH_2CH(NH_2)CO_2H$ | $HN=C(NH_2)NHCH_2CH_2CH_2$ |

Examples of chiral bicyclic monoterpenoid alcohols include isopinocampheol, borneol, isoborneol, fenchol, verbenol, camphenilol, myrtenol, nopol and perilla alcohol, while examples of chiral tricyclic sesquiterpenoid alcohols include cedrol and longifolol. Many of these alcohols may be obtained as R or S enantiomers.

In compounds according to the invention the two chiral units are incorporated into a molecule containing a mesogenic combination of groups, wherein the term mesogenic means that the resulting compound either shows a smectic liquid crystal phase, or is miscible with compounds or mixtures of compounds which show smectic liquid crystal phase without substantial suppression of those phases.

Various advantageous mesogenic combinations embodying the invention have been devised, and therefore according to a further aspect of the invention there is provided a compound suitable for use in a ferroelectric smectic liquid crystal composition, the compound having a structure (8)

independently represents 1,4-linked phenyl or trans 1,4-linked cyclohexyl; each n independently represents 0 or 1; wherein each of $C_1$ and $C_2$ are independently selected from the chiral groups (1), (2A), (2B) and (2C) above and each of $C_3$ and $C_4$ are independently selected from (1), (2A), (2B), (2C), (3) and (4) above *provided* that if both $C_3$ and $C_4$ are present, then $C_3$ is selected from (1), (2A), (2B) and (2C) and *provided* that at least two of $C_1$, $C_2$, $C_3$ and $C_4$ are present, wherein Z is either a single bond or a linking group selected from COO, OOC, $CH_2CH_2$, CH=NH, $CH_2O$;

wherein each of X and Y is *either* an alkyl or alkoxy group *or* a chain of up to 3 linked cyclic groups independently selected from phenyl, pyridyl, pyrimidyl, trans-cyclohexyl, cyclohexyl having one or two $CH_2$ units replaced by O, N or S; bicyclo(2,2,2)octane or naphthyl; and each of these cyclic groups may carry one or more substituents lateral to the chain or at the chain terminus; and each of these cyclic groups may be linked to adjacent groups either directly by a single covalent bond or by any of the groups from which Z is selected;

provided that if $C_4$ is chiral unit (3) or (4), Y is H.

Two or more of the chiral groups $C_1$, $C_2$, $C_3$ and $C_4$ may be the same provided that not more than two are chiral unit (3).

When X is alkyl or alkoxy it is preferably n-alkyl or alkoxy containing 5–12 carbon atoms. When Y is alkyl or n-alkoxy it is preferably n-alkyl containing 1–5 carbon atoms and present as an alkyl ester.

When X and/or Y contain cyclic groups they are preferably linked to adjacent groups at the ring position(s) depicted below:

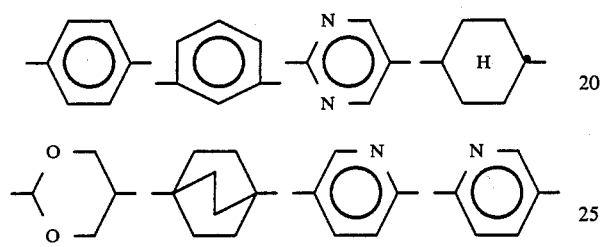

Lateral substituents on cyclic groups in X or Y may be selected from methyl methoxy, fluorine, chlorine $CF_3$, bromine or cyano. When a cyclic group in X or Y is adjacent to a chiral group $C_1$, $C_2$, $C_3$ or $C_4$ the substituents are preferably on ring positions flanking the link between the ring and the chiral group, so as to sterically hinder rotation of X or Y relative to the chiral group. When a cyclohexyl ring is present in X or Y and the ring is linked in the 1,4-positions, substituents are preferably also at the 1 and 4 positions.

Terminal substituents on X and Y when these are chains of cyclic groups may be selected from alkyl or alkoxy, alkylcarbonyloxy, alkoxycarbonyl, halogen substituted analogues of these, straight, branched or chiral chain forms of these, halogen or CN. Organic terminal groups preferably on X contain 5–12 carbon atoms, and on Y contain 1–5 carbon atoms. Preferred terminal substituents on X are n-alkoxy or n-alkyl. The terminal substituent on X or Y may be linked to a ring either directly or via an intervening group selected from the Z groups.

The links between X, Y the indicated phenyl or cyclohexyl rings and a chiral group $C_1$, $C_2$, $C_3$ or $C_4$ will depend upon the nature of X and Y and the chiral group. Appropriate links will be apparent to the chemist. X and/or Y may be linked directly to the chiral group, or one of the links from which Z may be selected may intervene.

Most conveniently chiral group (1) may be linked at both linking positions by ester links, eg

or by an ester link and an amide link to a nitrogen atom in X, Y or Z eg

The linking of the amino acid based groups (2A), (2B) and (2C) may be by ester or amide links to carboxylate positions in the α-position and/or to carboxylate groups in the residue A if these are present, eg aspartic acid, and either or both of these positions may be used. Similarly linking may be by amide or amine links to amino groups in the α-position and/or to amino positions in the residue A if these are present, eg ornithine, and either or both of these positions may be used.

Examples of these forms of linking are given below:

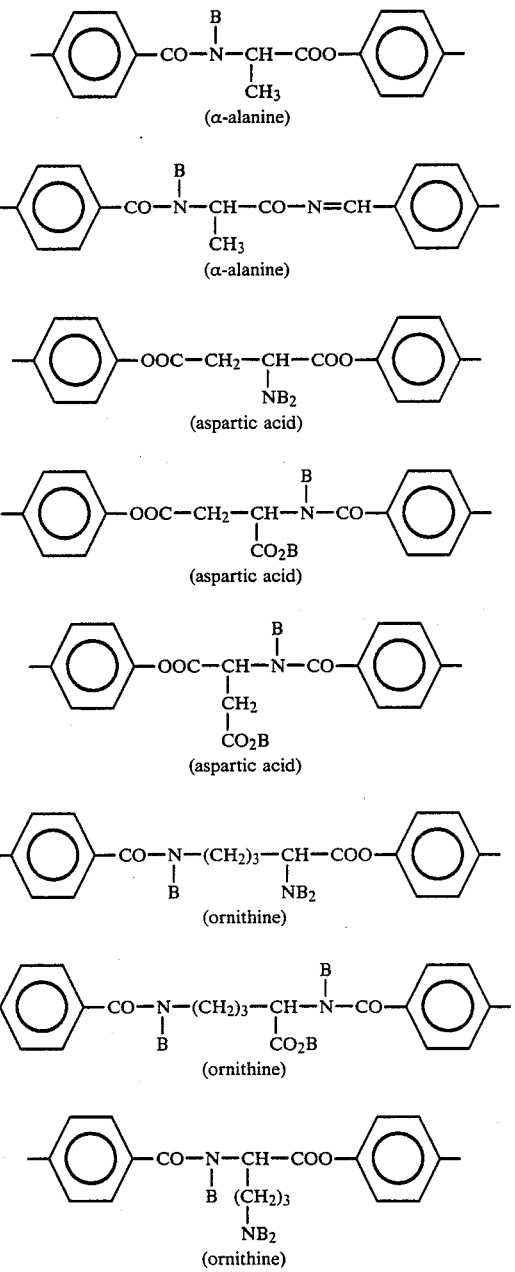

The linking of the chiral unit (5) will be most conveniently in the form of an ester, ie

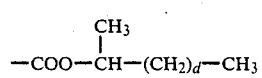

Terpenoid alcohols contain the hydroxyl functional group and it is thus relatively straightforward to form an ester link to an adjacent group, ie to the chiral unit $C_3$ or to one of the indicated phenyl or cyclohexyl rings, as for example with menthol, as shown below:

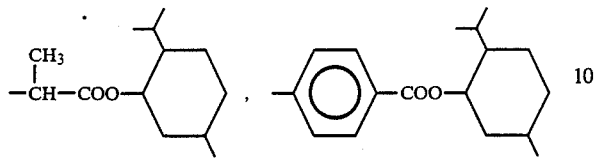

The term 'derived from naturally occurring terpenoids' used with respect to chiral unit 4 above includes such direct esterification processes, where the structure of the terpenoid ring is chemically unchanged.

Some examples of combinations of cyclic groups and links from which X and Y may be independently selected in compounds of structure (8) are listed in Tables 2, 3, 4 and 5 in which each CY unless otherwise identified may be any of the cyclic groups from which X and Y may be built up as discussed above, and may be substituted as discussed above. If the combination is to function as an X group, R may be $C_{5-12}$ n-alkyl or alkoxy, and R' may be $C_{5-12}$ n-alkyl. If the combination is to function as a Y group, R may be $C_{1-5}$ n-alkyl or n-alkoxy and R' may be $C_{1-5}$ n-alkyl.

TABLE 2

| | |
|---|---|
| R | R'OOCCYOCCY |
| RCY | R'COOCYOOCCY |
| RCYCY | R'COOCYCOOCY |
| RCYCYCY | R'OOCCYCOOCYCY |
| RCYCH$_2$CY | R'COOCYCOOCYCY |
| RCYCH$_2$CYCY | R'OOCCYOOCCYCY |
| RCYCYCH$_2$CY | R'COOCYOOCCYCY |

TABLE 2-continued

| | |
|---|---|
| R'COOCY | R'OOCCYCYCOOCY |
| R'OOCCY | R'COOCYCYCOOCY |
| R'OOCCYCH$_2$CH$_2$CY | R'OOCCYCYOOCCY |
| R'COOCYCYCH$_2$CH$_2$CY | R'COOCYCYCOOCY |
| R'OOCCYCH$_2$CH$_2$CYCY | RCYCH$_2$OCY |
| R'COOCYCH$_2$CH$_2$CYCY | RCYOCH$_2$CY |
| R'OOCCYCYCH$_2$CH$_2$CY | RCYCH$_2$OCYCY |
| R'COOCYCYCH$_2$CH$_2$CY | RCYOCH$_2$CYCY |
| R CYCH=NCY | RCYCYCH$_2$OCY |
| RCYN=CHN | RCYCYOCH$_2$CY |
| RCYCH=NCYCY | RCYCH$_2$OCYCH$_2$OCY |
| RCYN=CHCYCY | RCYCH$_2$OCYOCH$_2$CY |
| RCYCYCH=NCY | RCYOCH$_2$CYCH$_2$OCY |
| RCYCYN=CHCY | RCYOCH$_2$CYCH$_2$OCY |
| RCYCOOCY | R'OOCCYCH=NCY |
| RCYOOCCY | R'OOCCYN=CHCY |
| RCYCOOCYCY | R'COOCYCH=NCY |
| RCYOOCCYCY | R'COOCYN=CHCY |
| RCYCYOOCCY | R'OOCCYCH=NCYCY |
| RCYCYCOOCY | R'OOCCYN=CHCYCY |
| RCYCOOCYCOOCY | R'COOCYCH=NCYCY |
| RCYOOCCYOOCCY | R'COOCYN=CHCYCY |
| RCYCOOCYOOCCY | R'OOCCYCYCH=NCY |
| RCYOOCCYCOOCY | R'OOCCYCYN=CHCY |
| R'OOCCYCOOCY | R'COOCYCYCH=NCY |
| R'OOCCYOOCCY | R'COOCYCYN=CHCY |

TABLE 3

| | | | |
|---|---|---|---|
| LL | AACYCYL | LCYT | CYOOCCYAAT |
| LLCY | LCYOOCYAA | CYLT | |
| CYLL | LCYOOCCYAA | LT | |
| LCYL | AACYCOOCYL | CYCYLT | |
| LCYCYL | AACYOOCCYL | AACYCOOT | |
| LCYCOOCYL | LCYCH$_2$CH$_2$CYAA | CYAAT | |
| LCYOOCCYL | AACYCH$_2$CH$_2$CYL | AAT | |
| LCYCH$_2$CH$_2$CYL | AAAA | CYCYAAT | |
| CYCYAAAA | AAAACY | LCYCYCOOCA | |
| CYCOOCYAAAA | CYAAAA | LCYCOOCYCOOCA | |
| CYOOCCYAAAA | AACYAA | LCYOOCCYCOOCA | |
| CYCH$_2$CH$_2$CYAAAA | AACYCYAA | CYCOOCYLCA | |
| LAACYCY | AACYCOOCYAA | AACYCYCCOCA | |
| AALCYCY | AACYOOCCYAA | AACYCOOCYCA | |
| LAACYCOOCY | AACYCH$_2$CH$_2$CYAA | AACYOOCCYCA | |
| AALCYOOCCY | CYCYLAA | CYCOOCYAACA | |
| LAACYCH$_2$CH$_2$CY | CYCYAAL | LCYCYCOOT | |
| AALCYCH$_2$CH$_2$CY | CYCOOCYLAA | LCYCOOCYCOOT | |
| CYCH$_2$CH$_2$CYLAA | CYOOCCYLAA | LCYOOCCYCOOT | |
| CYCH$_2$CH$_2$CYAAL | CYCOOCYAAL | CYCOOCYLT | |
| LCYAA | CYOOCCYAAL | AACYCYCOOT | |
| AACYL | LAA | AACYCOOCYCOOT | |
| LLCYCY | AAL | AACYOOCCYCOOT | |
| LLCYCOOCY | LAACY | CYCOOCYAAT | |
| LLCYOOCCY | AALCY | LCYCH$_2$CH$_2$CYCOOCA | |
| LLCYCH$_2$CH$_2$CY | CYLAA | CYCH$_2$CH$_2$CYLCA | |
| CYCYLL | CYAAL | CYOOCCYLCA | |
| CYCOOCYLL | LCYCOOCA | AACYCH$_2$CH$_2$CYCOOCA | |
| CYOOCCYLL | CYLCA | CYCH$_2$CH$_2$CYAACA | |
| CYCH$_2$CH$_2$CYLL | LCA | CYOOCCYAACA | |
| AAAACYCY | CYCYLCA | LCYCH$_2$CH$_2$CYCOOT | |
| AAAACYCOOCY | AACYCOOCA | CYCH$_2$CH$_2$CYLT | |
| AAAACYOOCCY | CYAACA | CYOOCCYLT | |
| AAAACYCH$_2$CH$_2$CY | AACA | AACYCH$_2$CH$_2$CYT | |
| LCYCYAA | CYCYAACA | CYCH$_2$CH$_2$CYAAT | |

TABLE 4

| | |
|---|---|
| LLCYL | LCYLCA |
| LLCYAA | LLCA |
| LCYLL | AALCYL |
| LAACYL | LAACYCA |
| AACYAAL | LCYCYLCA |
| LCYAACA | AALCYCA |

TABLE 5

| | |
|---|---|
| LLCYLCA | LAACYLCA |
| AALCYLL | LAACYLL |

TABLE 5-continued

| LLCYCYLCA | AALCYLCA |
| --- | --- |

In the compound of formula (8), the groups X and Y may be combined with a range of structural combinations of chiral groups $C_1$, $C_2$, $C_3$ and $C_4$ and the optional rings CY shown. Some combinations of these are shown by way of example in Tables 3, 4 and 5, using the following abbreviations:

L=chiral unit (1A) derived from lactic or mandelic acid with Ro being methyl or phenyl as appropriate, AA=any one of chiral units (2A), (2B) or (2C)

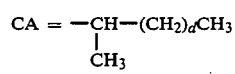

T=A cyclic chiral group derived from a naturally occurring terpenoid chiral unit (4), linked in the indicated position by an ester link to an —OH functional position on the terpenoid ring.

Table 3 shows examples having two chiral units, Table 4 shows examples having three chiral units and Table 5 shows examples having four chiral units.

The compounds of the invention may be prepared by a number of routes, the individual steps of which may be derived from literature methods, but which overall are novel.

Compounds containing one or more lactate groups, ie chiral unit (1) wherein Ro is methyl, may be prepared by variants of the methods described in PCT Application PCT/GB85/00512 (Applicants Ref D/PD Pats/-PO102). For example a compound having the structure:

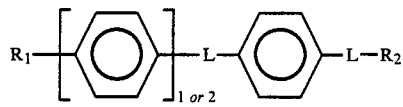

where L is —COO—CH(CH₃)COO—, $R_1$ is n-alkyl or n-alkoxy and $R_2$ is n-alkyl (eg in formula (5) X is

$C_1$ is present and is L, $C_2$ is absent, one phenyl ring is present and Z is a single bond, $C_3$ is L, $C_4$ is absent and Y is $R_2$) may be prepared by route A shown in FIG. 1, in which:

(i) 20% $K_2CO_3$ or 20% $Cs_2CO_3$, 90% MeOH, pH7; PhCH₂Br, DMF (ii)

N,N'-dicyclohexylcarbodiimide (DCC), ie 4'-(N-pyrrolidinopyridine) (N-PPy), $CH_2Cl_2$ (iii) 5% Pd-C, ethyl acetate, $H_2$.

(iv) Ph.CH₂Br, NaOH, ethanol solvent.

(v) oxalyl chloride, DMF, $R_2$-lactate, benzene solvent; $CH_2Cl_2$, triethylamine.

(vi) as step (iii)

(vii) as step (v), using product of step (vi) in place of $R_2$-lactate.

This route is general, the reactions involved in the individual steps are well known, and by choosing appropriate X—CO₂H and

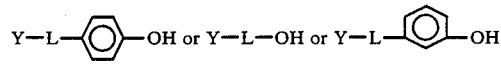

compounds a range of other structures may be prepared.

Compounds having the structure

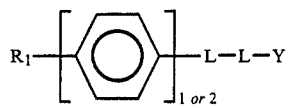

may be prepared from the carboxylic acid produced in step (iii), by esterifying this with an appropriate Y-lactate ester, using known esterification methods, for example commercially available S-(−)-ethyl lactate, for example to produce the compound:

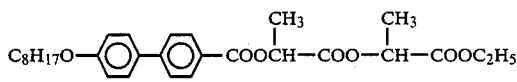

where Y is ethyl.

Alternatively route B set out in FIG. 2 may be used.

Routes A and B are of general applicability, and using them a large range of compounds containing two lactate (—COO.CH(CH₃).COO—) or mandelate groups may be prepared.

Compounds containing one or more amino acid groups, ie chiral groups (2A), (2B) or (2C) may be prepared by variants of the preparative methods described in UK Patent Application 8620111 taking precautions to protect and de-protect functional groups as described therein.

For example a compound having a structure containing chiral units (2A) and (1):

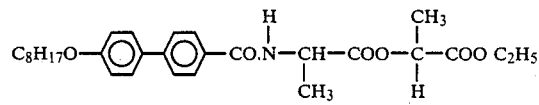

may be prepared by using routes 1 and 2 of GB 8620111 using as the compound YOH in that route, commercially available ethyl lactate, ie in route C shown in FIG. 3.

In route C:

(i) Ph-CH₂ O CO Cl (ii) Ethyl S-(−)-lactate, NN'-dicyclohexylcarbodiimide (iii) $H_2$/Pd-C (iv) 4-n-octyloxybiphenylyl-4'-carboxylic acid, oxalyl chloride, dimethylformamide.

Similarly, from carboxylic acids of the tpye:

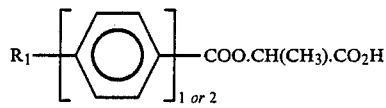

prepared as in route A step (ii) above, compounds of the structure:

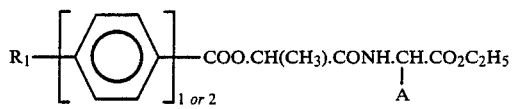

may be prepared, using for example route 1 of UKPA 8620111 summarised as route D shown in FIG. 4. In route D:

(i) oxalyl chloride, DMF, benzene solvent, H$_2$NCH(A)COOH (ii) as step (ii) of route A.

Methods for the preparation of other compounds of the invention containing chiral units derived from α-amino acids and α-hydroxycarboxylic acids may also be deduced from the patent applications referred to above. Compounds in which the NH unit of the amino acid have been replaced by N—CH$_3$ or other N-alkyl units may be prepared by the method described in GB8620111 using the alkylation method of E. Fischer and W. Lipschitz, Berichte (1915) p360–378.

Similarly by routes related to those in UKPA 8620111 compounds may be prepared which are esters or amide derivatives of —OH, CO$_2$H and NH$_2$ groups in the residue, for example using routes 5, 6, and 7 of that application, with the appropriate carboxylic acid or hydroxy terminated compound, to produce compounds containing chiral units (2B) and (2C), together with chiral unit (1).

For example using route 6 of UKPA 8620111 with

as Y—CO$_2$H and S-(—)-ethyl lactate as X.OH, the compound:

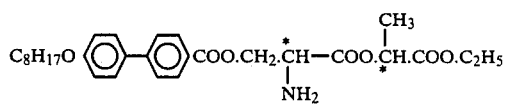

may be prepared from serine, containing chiral unit (2B). This route is summarised in route E shown in FIG. 5.

(i) Ph.CH$_2$OCO.Cl, NaHCO$_3$ aq.
(ii) as step (i) of route A.
(iii) as step (ii) of route A.
(iv) as step (iii) of route A.

(v) as step (v) of route A, S-(—)-ethyl lactate.

Similarly using route 7 of UKPA8620111 with S-(—)-ethyl lactate as Y—OH the compound:

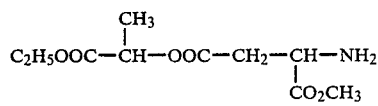

may be prepared (as its quaternary ammonium salt), from aspartic acid. From this via route 1 of UKPA8620111 using

the compound

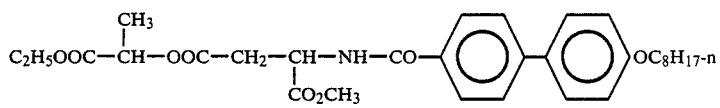

may be prepared, containing chiral unit (2C).

This route is summarised in route F (FIG. 6) in which:

(i) as step (i) of route E.
(ii) paraformaldehyde, thionyl chloride, acetic anhydride, acetic acid.
(iii) S-(—)-ethyl lactate, DCC, NPPy.
(iv) as step (iii) of route A.
(v) as step (ii) of route A.

Compounds containing chiral groups (4) and (5) are relatively easy to prepare from the appropriate alcohol, for example octan-2-ol

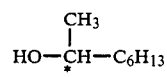

or menthol:

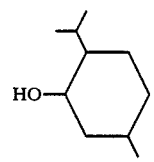

by simple esterification reactions, for example from the carboxylic acid:

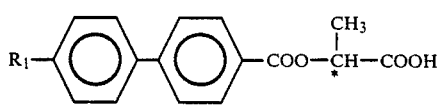

prepared as in route A above. To prepare a compound:

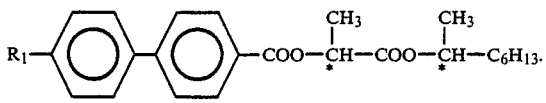

for instance, a chiral 2-octyl lactate ester may be prepared by well known methods, and this may be used instead of the ethyl lactate described above. A compound having a structure

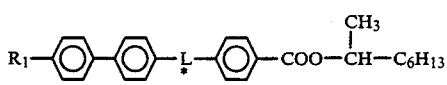

may for example be prepared by first preparing the 4-hydroxy benzoic acid ester of chiral octan-2-ol, ie

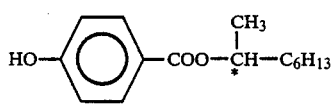

and using this in step (vii) of route A above instead of the parahydroxy phenyl lactate analogue. Similar routes enable the preparation of the terpenoid derivatives from the terpenoid alcohols.

The corresponding amino acid esters of secondary alcohols and terpenoid alcohols may be prepared by analogous routes, for example using a variant of route C described above. In step (ii) of that route, replacement of ethyl S-(−)-lactate by octan-2-ol or menthol for example will lead to the compounds

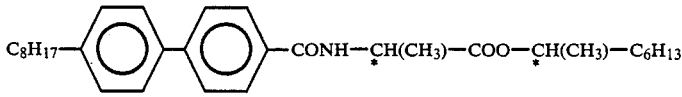

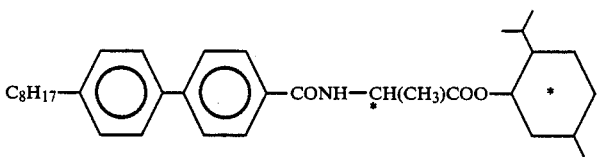

respectively.

Related esterification processes, using carboxylic acid groups in the residue may be used to obtain other compounds by similar methods.

In each of the preparative routes referred to above, to produce a compound containing a chiral centre in an optically active form it is necessary to start from a material containing the chiral centre in an optically active form and to check the optical purity at each of the steps of the route. To prepare a compund containing the chiral centre in a racemic form, then racemic strting materials may be used. Optically pure starting materials containing the chiral centers (1) to (4) above are commercially available.

The invention further provides a ferroelectric smectic liquid crystal composition containing at least one compound of formula 8. The compound(s) of formula 8 may be racemic or optically active, and in the latter case it may function as a chiral dopant in the smectic composition.

It will be apparent that the chiral centres in a compound of the invention may all have the same absolute configuration, sense of optical activity, and sense of polarisation in the ferroelectric mixture, or that they may differ.

Preferably all the chiral centres in the compound have the same sense of optical activity and sense of polarisation, so that their contribution to the ferroelectric properties of the compound, or to its ability to induce a ferroelectric phase in a smectic composition are all additive.

For example if all the chiral centres are derived from lactic acid they may all be S-(−).

It is also possible for the chiral centres in a compound of the invention to be of configurations which induce induce opposing twists of the helical chiral tilted smectic phase, in for example an internal racemate, whilst at the same time the contributions to Ps are additive. This effect may be achieved particularly if the chiral centres are chemically different, eg a secondary alcohol ester with a lactate group, or a lactate and a terpenoid. In such a case, if the compound is used as a chiral dopant in a chiral smectic composition, the resulting chiral smectic phase may have a long, in some cases infinite helical pitch length, whilst maintaining a high Ps.

Preferred structural forms of compounds of formula 8 for use in ferroelectric smectic liquid crystal compositions, especially as chiral dopants will now be discussed.

There appears to be no practical advantage in having more than four cyclic groups, including the two indicated phenyl or cyclohexyl rings, in the compound of formula 8.

Many mesogenic combinations of X and Y may be devised with varying effectiveness at inducing a high Ps in a smectic host, but a particularly effective combination is:

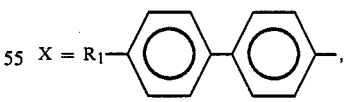

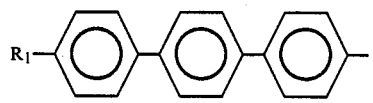

where $R_1$ = n-alkyl or n-alkoxy containing 5–12 carbon atoms, Y = n-alkyl containing 1–5 carbon atoms present as an ester.

Compounds containing one or more lactate units, ie one or more of chiral unit 1A are particularly preferred, eg compounds of formula 9 below:

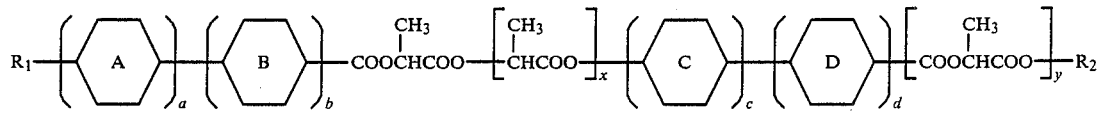

which rings may carry one or more fluoro or chloro substituents: each of a, b, c, d, being 0 or 1, the sum (a+b+c+d) being 2 or 3, $R_1$ and $R_2$ being n-alkyl or n-alkoxy containing 1 to 12 carbon atoms, each of x and y being 0 or 1, one being 1.

Some preferred examples of compounds of formula 9 are listed below:

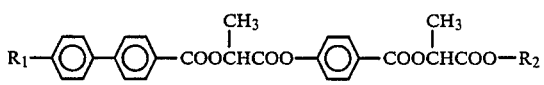 9.1

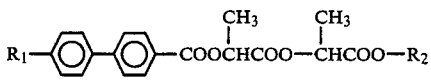 9.2

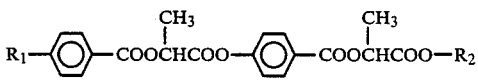 9.3

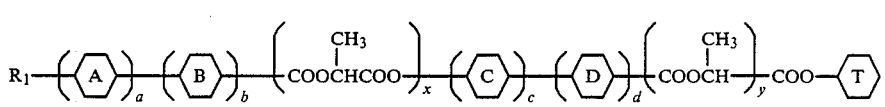 9.4

A second preferred class of compounds is those containing one or more lactate units, ie one or more of chiral unit 1A, together with a chiral unit 3, especially a chiral unit 3 derived from 2-octyl (2-methylheptyl), eg having a general formula 10 below:

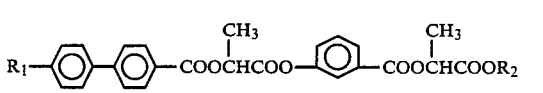

where $R_1$, 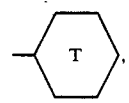

are as defined in formula 9, a, b, c, d are independently 0 or 1, the sum (a+b+c+d) being 2 or 3; x and y are each 0 or 1, one being 1.

Some preferred examples of compounds of formula 10 are:

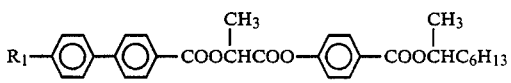 10.1

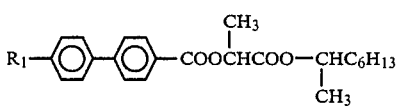 10.2

A third preferred class of compounds is those containing one or more lactate groups, ie one or more of chiral units 1A, together with a terpenoid group, ie chiral unit 4, especially a chiral unit 4 derived from a cyclic terpenoid, eg compounds having a general formula 11:

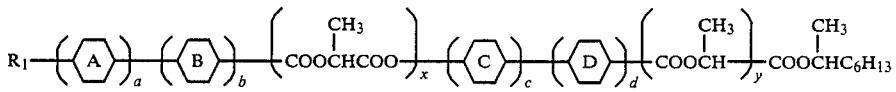

where $R_1$, , , , 

are as defined in formula 9 above; a, b, c, d, are independently 0 or 1, the sum (a+b+d+c) being 2 or 3; x and y are each 0 or 1, one being 1; and

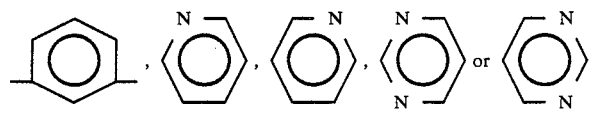

represents a cyclic group derived from an optically active terpenoid alcohol (as defined above).

Preferred compounds of formula 11 have a formula:

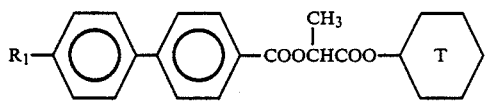 11.1

Preferred groups

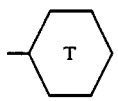

in formula 11 and 11.1 are those listed below, where the terpenoid alcohol from which they are derived is also indicated:

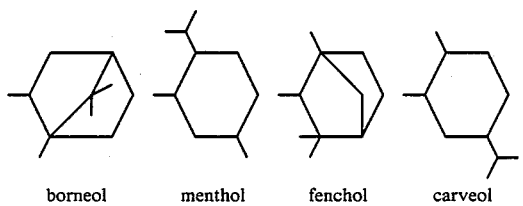

borneol   menthol   fenchol   carveol

isopinocampheol

In formulae 9, 10 and 11 R₁ is preferably n-C₈H₁₇O, and

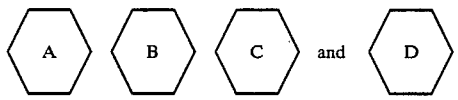

when present are preferably all 1,4-linked phenyl.

A ferroelectric smectic liquid crystal mixture according to this aspect of the invention contains one or more compounds of formula 8, either optically active or racemic, preferably one or more optically active or racemic compounds of formulae 9, 10 or 11.

Such a ferroelectric smectic liquid crystal mixture will also normally contain one or more other compounds which either separately or when mixed together show a smectic liquid crystal phase, preferably Sc, over a useful temperature range. Such compounds or mixtures thereof are generally termed "smectic hosts". A wide range of smectic hosts is known, but two particularly preferred types of host are:

(a) The compounds disclosed in PCT/GB86/0040, eg having a formula:

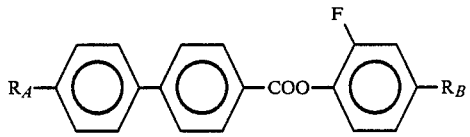

where $R_A$ is n-alkyl or n-alkoxy and $R_B$ is n-alkyl, or mixtures thereof, especially eutectic mixtures.

(b) The terphenyls disclosed in EPA 84304894-3 eg having a formula:

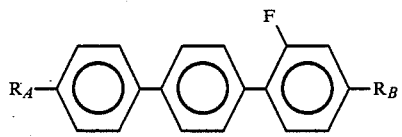

where $R_A$ and $R_B$ are independently selected from n-alkyl and n-alkoxy, or mixtures thereof, especially eutectic mixtures.

Other known examples of smectic hosts include compounds of the following general formulae:

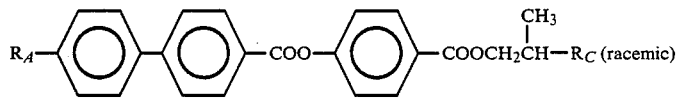

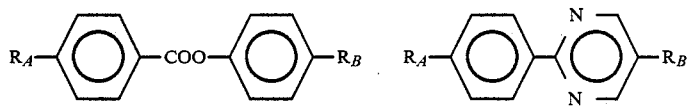

where $R_A$ and $R_B$ are independently selected from n-alkyl and n-alkoxy and $R_C$ is n-alkyl, preferably ethyl.

The mixture may also contain other optically active compounds which are miscible with smectic materials, for example the lactic acid derivatives disclosed in PCT GB/85/00512, eg

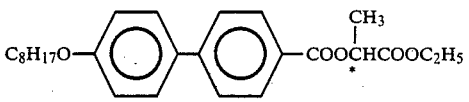

or the compounds disclosed in EPA 0110299, eg:

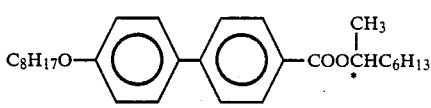

or the terpenoid derivatives disclosed in PCT/GB86/0046.

If the mixture includes more than one optically active compound, eg a compound of formula I and one of the other optically active compounds mentioned above, then the helical twist senses of the S* phase induced by these compounds may be the same or opposite, eg by the use of both (+) and (−) optically active compounds. It is often desirable to include compounds which induce opposite twist senses of the S* phase in order to increase the helical pitch length. It is desirable that each optically active compound in the mixture induces the same sense of Ps in the mixture.

The mixture may also contain other known additives to improve the properties, eg Ps, Sc phase breadth, viscosity etc or to induce the appearance of an $S_A$ phase of a temperature above the $S^*_C$ to assist alignment. An example of a class of compounds which may be used to broaden the Sc phase is:

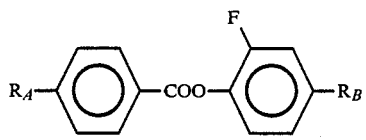

where $R_A$ and $R_B$ are independently $C_{1-12}$ n-alkyl or n-alkoxy.

The mixture may also contain pleochronic dyes.

Typically but not exclusively a ferroelectric smectic liquid crystal mixture of the invention will have the following composition:

| | |
|---|---|
| One or more smectic host compounds | 30–99 weight % |
| Optically active compound(s) of formula 8 | 1–50 weight % |
| Other optically active compound(s) | 0–20 weight % |
| Additives and pleochroic dye if present | 0–20 weight % |
| Racemic compound(s) of formula 8 | 0–20 weight % |

The total being 100 weight%. The nature and relative proportions of the various components of a liquid crystal material of the invention will depend upon the use for which the material is intended, and some experimentation may be necessary to suit a particular requirement, but the basic principles of mixing and assessment of such materials is well known in the field.

The liquid crystal materials of the invention may be used in any of the known types of ferroelectric smectic liquid crystal display device, eg the "Clark-Lagerwall Device" described in Appl. Phys Lett (1980), 36 899 and in Recent Developments in Condensed Matter Physics (1981), 4,309. The physics of this type of device and the method of constructing it are well known, and are described for example in PCT/GB85/00512, and PCT/GB86/0040. In practice such a device usually consists of two substrates, at leastvone of which is optically transparent, electrodes on the inner surfaces of the substrates by which a voltage may be applied and a layer of the liquid crystal materials sandwiched between the substrates. It is desirable that the helical pitch length of the $S_C^*$ phase is comparable to the thickness of the material, which is why long pitch mixtures are useful. The materials of the invention may be used in both the birefringence type display mode and the guest-host type display mode of the Clark-Lagerwall device/ The device may for example be in the form of a clock, calculator or video screen display, and methods of making the device in this form will be well known to those skilled in the art.

The invention will now be described by way of example only, with reference to the following figures.

Figure 1:
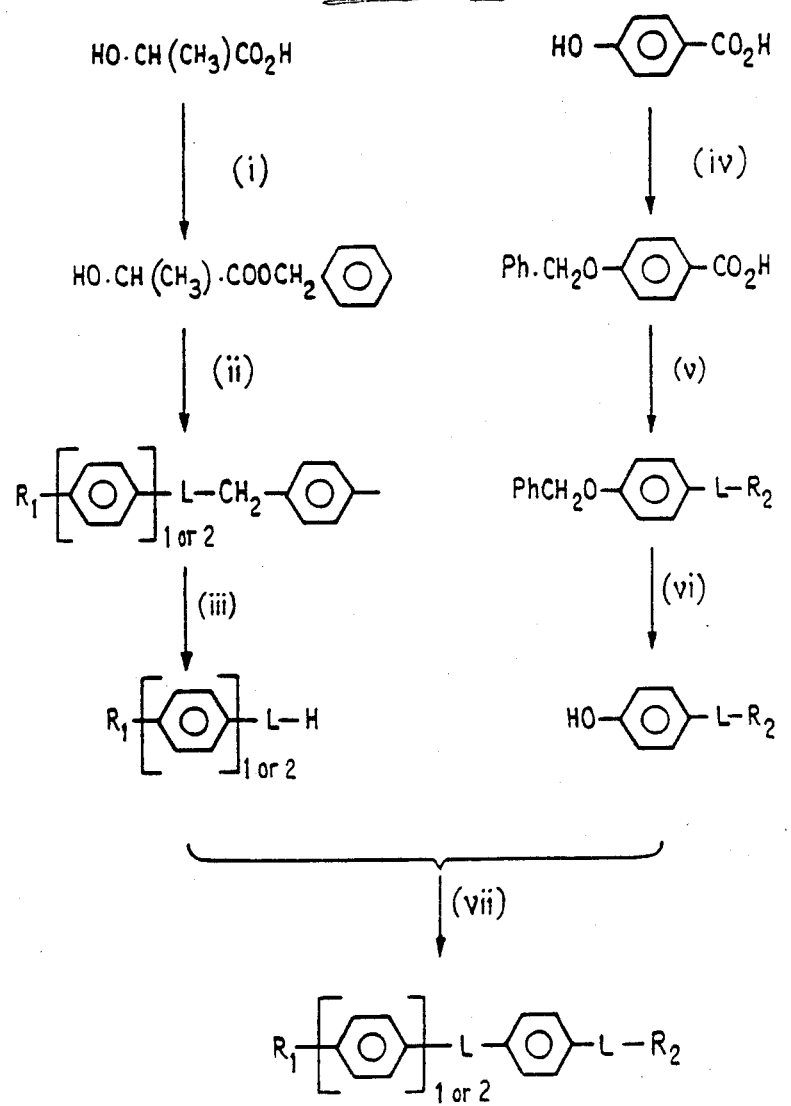
FIGS. 1 to 6 show preparative routes A to F described above.
Figure 2:
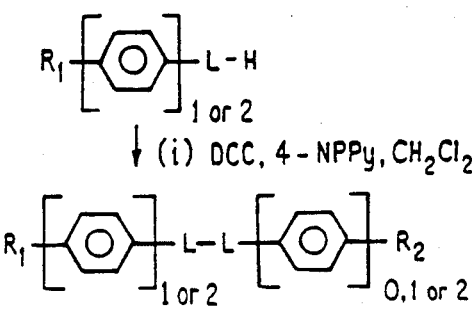
Figure 3:
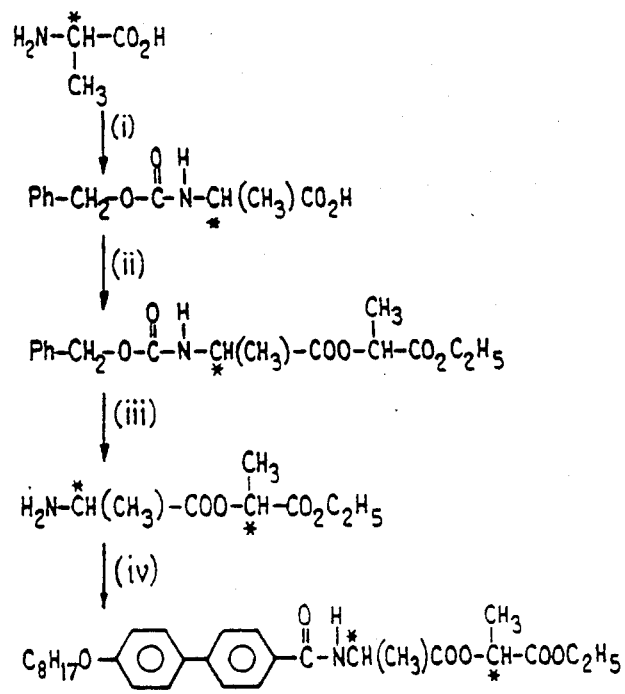
Figure 4:
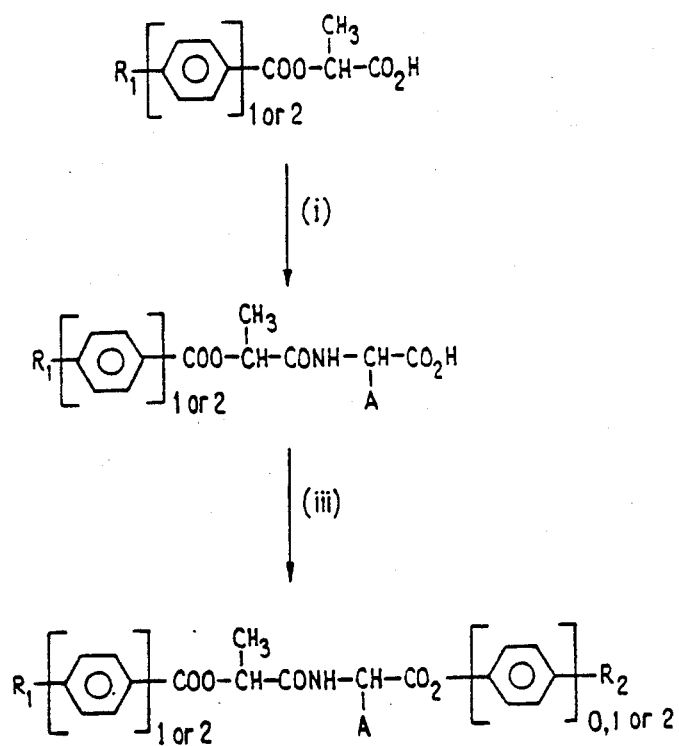
Figure 5:
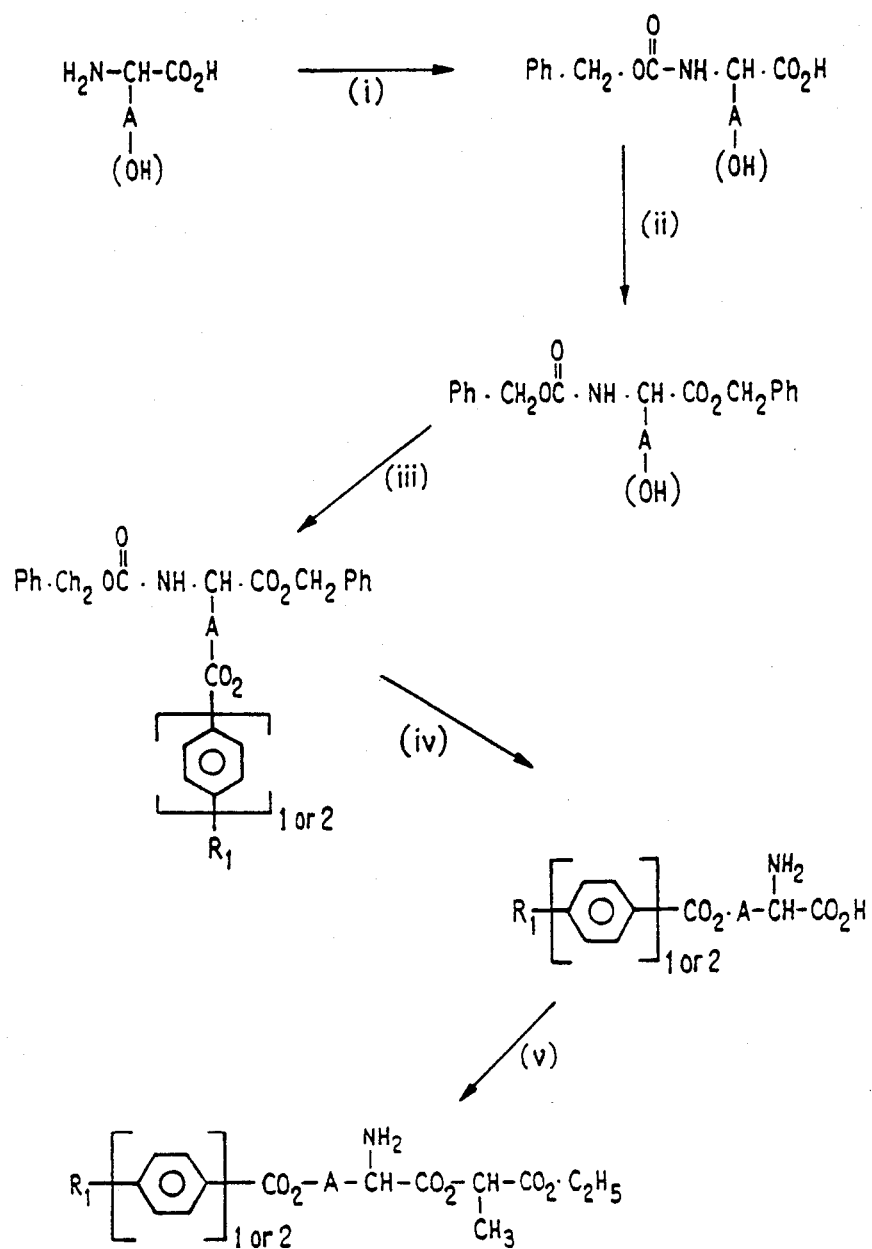
Figure 6:
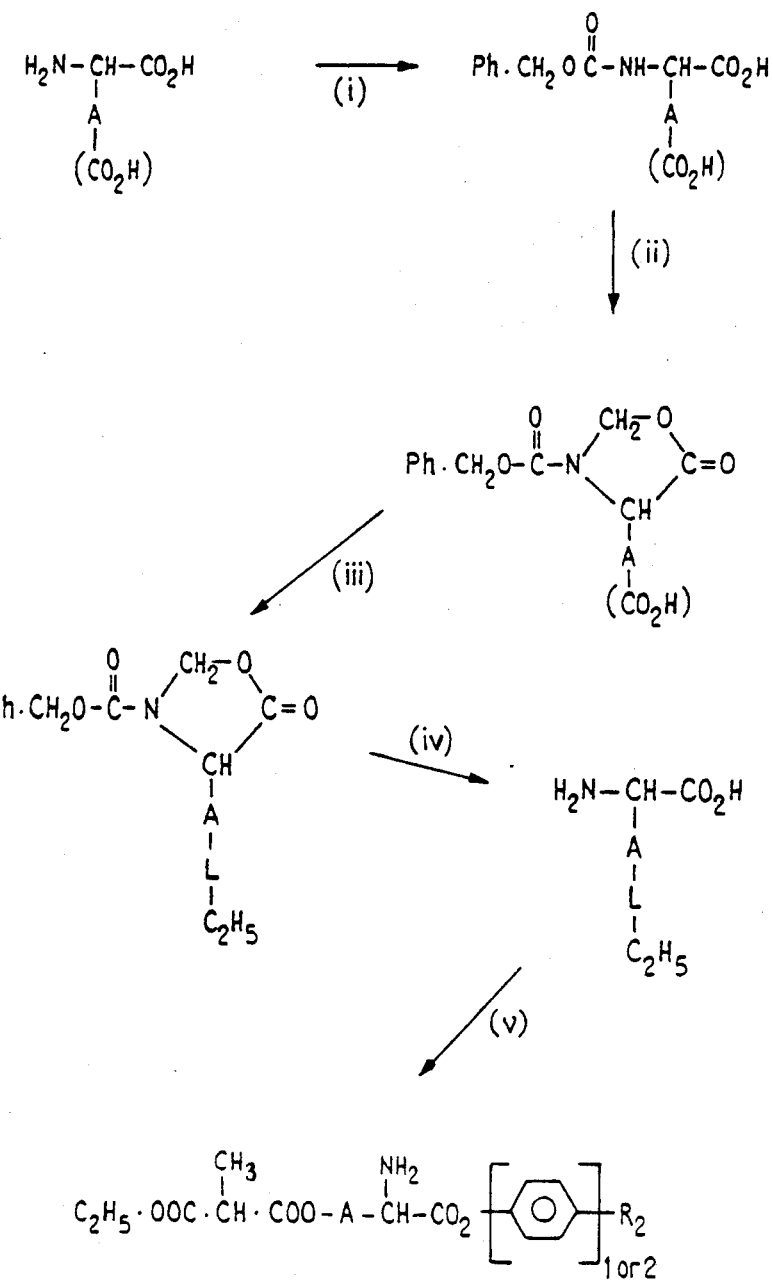

In the examples below:

C = solid crystal
I = isotropic liquid
$S_A$ = smectic A (other smectic phases shown appropriately)
$\mu_{eff}$ = magnitude of effective dipole moment, estimated using $$\mu_{eff} = \frac{Ps \times \text{molar mass}}{\text{Avogadro's } N^\circ \cdot x \text{ density}}$$

Ps is given in nCcm$^{-2}$
$[\alpha]_D^{24}$ = optical rotation angle at 24° using Na D line.
Ps and $u_{eff}$ are extrapolated to 100% from mixtures containing ca. 10 mole %. Data on Ps, $\mu_{eff}$, tilt angle are given at 10° C. below the $S_A$–$S_C$ transition unless stated otherwise.

RCE8 is racemic

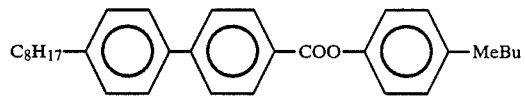

PG495 is racemic

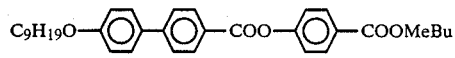

L is

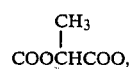

MeBu is 2-methylbutyl, Et is ethyl, DMF is dimethylformamide, Ph is phenyl, CA is CH(CH$_3$)C$_6$H$_{13}$

PREPARATION EXAMPLES

Example 1

Preparation of:

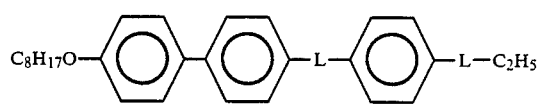

using route A described above.

Step A(i) Preparation of:

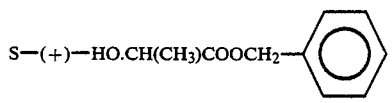
(A)

S-(+)- lactic acid (18.0 g) was dissolved in methanol (360 ml) and water (40 ml) was added. The solution was titrated to pH 7.0 (pH meter or paper) with 20% aqueous caesium carbonate (ca. 160 ml). The solvent was removed under reduced pressure at 50° C. and the residue was re-evaporated twice from N,N-dimethylformamide (DMF) (2×100 ml) at 50° C. The wite solid caesium salt was stirred with benzyl bromide (34.3 gm) in DMF (300 ml) for 15 hr. The caesium salt was filtered off, the filtrate was concentrated and then ether added to the residue (150 ml). The organic layer was washed successively with water (100 ml), saturated NaHCO$_3$ (500 ml) and water (100 ml) and finally dried (MgSO$_4$). After removal of the solvent, the residual liquid was distilled under reduced pressure to afford the product as a colourless liquid, yield (28.8 gm (30%), bp 96° C. (0.05 mm Hg), $[\alpha]_D^{24}$ −12.9 (c. 0.01, CHCl$_3$). (note: the commercially available lactic acid (Aldrich) was redistilled prior to use).

Ref. S. S. Wang, J.O.C., 41, 3258, (1976).

Step A(ii) Preparation of:

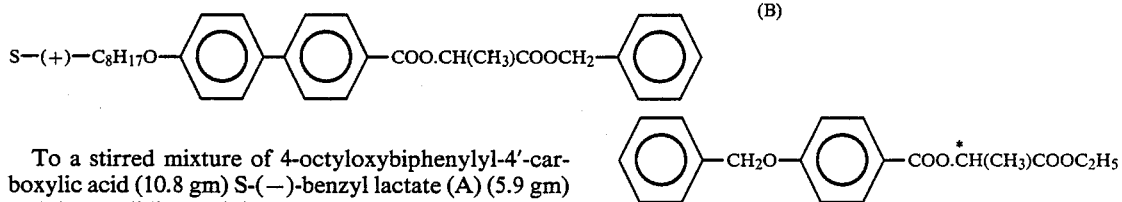
(B)

To a stirred mixture of 4-octyloxybiphenylyl-4'-carboxylic acid (10.8 gm) S-(−)-benzyl lactate (A) (5.9 gm) and 4-pyrrolidinopyridine (N-PPy) (0.49 gm) in sieve-dried CH$_2$CH$_2$ (250 ml), a solution of N,N-dicyclohexylcarbodiimide (DCC) (7.5 gm) in sieve-dried CH$_2$Cl$_2$ was slowly added. The mixture was stirred for 5 hr at room temperature. The N,N-dicyclhexylurea (DCU) was filtered off and the filtrate was washed successively with water (100 ml), 5% aqueous acetic acid (100 ml), and water (2×100 ml) and finally dried (MgSO$_4$). After removal of the solvent the crude diester was purified by column chromatography using silica gel and dichloromethane:petroleum fraction (bp 60°-80° C.) (4:1) as eluent. The product was recrstallised from ethanol.

Yield 11.1 gm (69%), mp 62.5° C., $[\alpha]_D^{24}$ +24.7 (c. 0.01CHCl$_3$).

Ref. A. Hassner & V. Alexanian, Tetrahedron Letters, 46, 4475, (1978).

Step A(iii). Preparation of:

S-(+)-C$_8$H$_{17}$O—⟨O⟩—⟨O⟩—COO.ĊH(CH$_3$)COOH (C)

Compound (B) (11.0 gm) was dissolved in ethyl acetate (150 ml). 5% Pd on charcoal (200 mg) was added and the mixture was stirred overnight under an atmosphere of hydrogen. After hydrogenation (500 cm$^3$ consumed) was completed, the catalyst was filtered off and the filtrate evaporated to dryness. The colourless solid residue (single spot by tlc) was crystallised from petroleum fraction (bp 60°-80° C.) to give (C) as colourless needles.

Yield 8.6 gm, (95%), mp 126° C., $[\alpha]_D^{24}$ +40.8 (c. 0.01CHCl$_3$).

Step A(iv). Preparation of:

⟨O⟩—CH$_2$O—⟨O⟩—COOH (D)

A solution of NaOH (0.4 mol) in water (50 ml) was added to a stirred suspension of 4-hydroxybenzoic acid (0.19 mol) in ethanol (100 ml). The stirred mixture was heated under reflux until all the acid had dissolved. Redistilled benzyl bromide (0.195 mol) was added dropwise. The stirred solution was heated under reflux overnight. The mixture was poured onto ice (ca. 600 gm) and the resulting suspension was acidified with conc. HCl and stirred for 20 min. The product was then extracted into ethyl acetate (ca. 1000 ml), washed with saturated brine ca 1000 ml) and finally dried over MgSO$_4$. The crude product was recrystallised from ethanol to yield (D) as a white crystalline solid.

Yield 28 gm (63%), mp 192° C.

Step A(v). Preparation of:

(E)

⟨O⟩—CH$_2$O—⟨O⟩—COO.ĊH(CH$_3$)COOC$_2$H$_5$

Oxalyl chloride (0.14 mol) and then DMF (one drop) were added to a suspension of benzoyloxybenzoic acid (D) (0.57 mol) in dry benzene, (40 ml) and stirred for 4 hr. The benzene and any unreacted oxalyl chloride were then removed by codistilling under reduced pressure. The acid chloride formed was then dissolved in dry dichloromethane (40 ml) and added dropwise, with stirring, to a solution of ethyl lactate (0.07 mol) and dry triethylamine (3 ml) in dry dichloromethane (40 ml) at 0° C. The mixture was then stirred overnight at room temperature. The product was extracted into chloroform (200 ml), washed with dilute HCl (200 ml), water (2×200 ml) and dried over MgSO$_4$. The crude product was purified by column chromatography (silica gel 60–120 mesh; 2:1 chloroform/petrol eluent) and recrystallised from petroleum ether (fraction 60°/80° C.), to afford the benzylated ester (E) as a white crystalline solid.

Yield 12 gm (65%), mp 75° C.

Step A(vi). Preparation of:

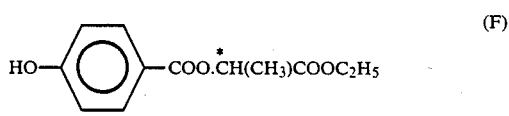
(F)

The product of Step A(v) (E) was dissolved in ethyl acetate and hydrogenated as in Step A(iii) above.

Step A(vii). Preparation of:

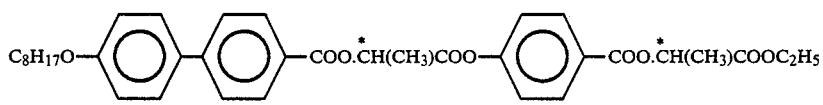 (G)

This step was carried out using the method of step A(v), using the product of Step A(iv) instead of 4-benzoyloxybenzoic acid, and the product of step A(vi) instead of the ethyl lactate. The product was recrystallised from ethanol to yield a white crystalline solid.

Example 2

Preparation of:

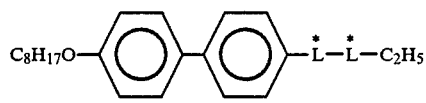 (H)

using route B described above.

The starting material:

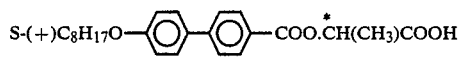 (C)

was prepared as in Step A(iii) above. The reaction was carried out as described in step A(ii) above using (C) (13 gm) as the carboxylic acid, and S-(−)-ethyl lactate (4.0 gm) instead of the S-(−)-benzyl lactate.

The following examples 3 and 4 are examples illustrating the properties of liquid crystal mixtures containing compounds of the invention.

Example 3

Host: a 1:1:1 by weight mixture of:

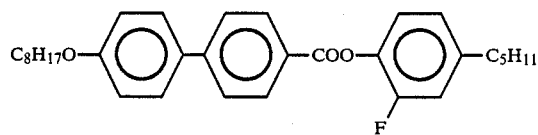 (a)

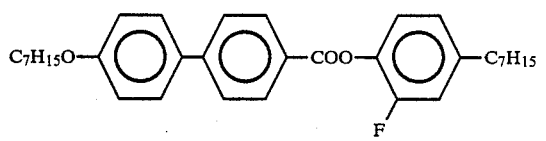 (b)

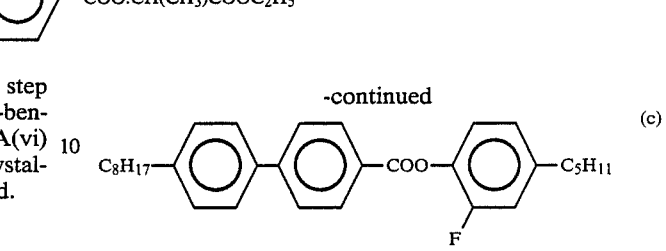 (c)

Dopant:

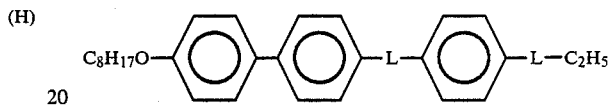

The dopant was used as an 11 wt% solution in the host. The solution showed the liquid crystal transitions:

S?25′S$_C$84.6S$_A$105.5Ch140′I

Figure 7:
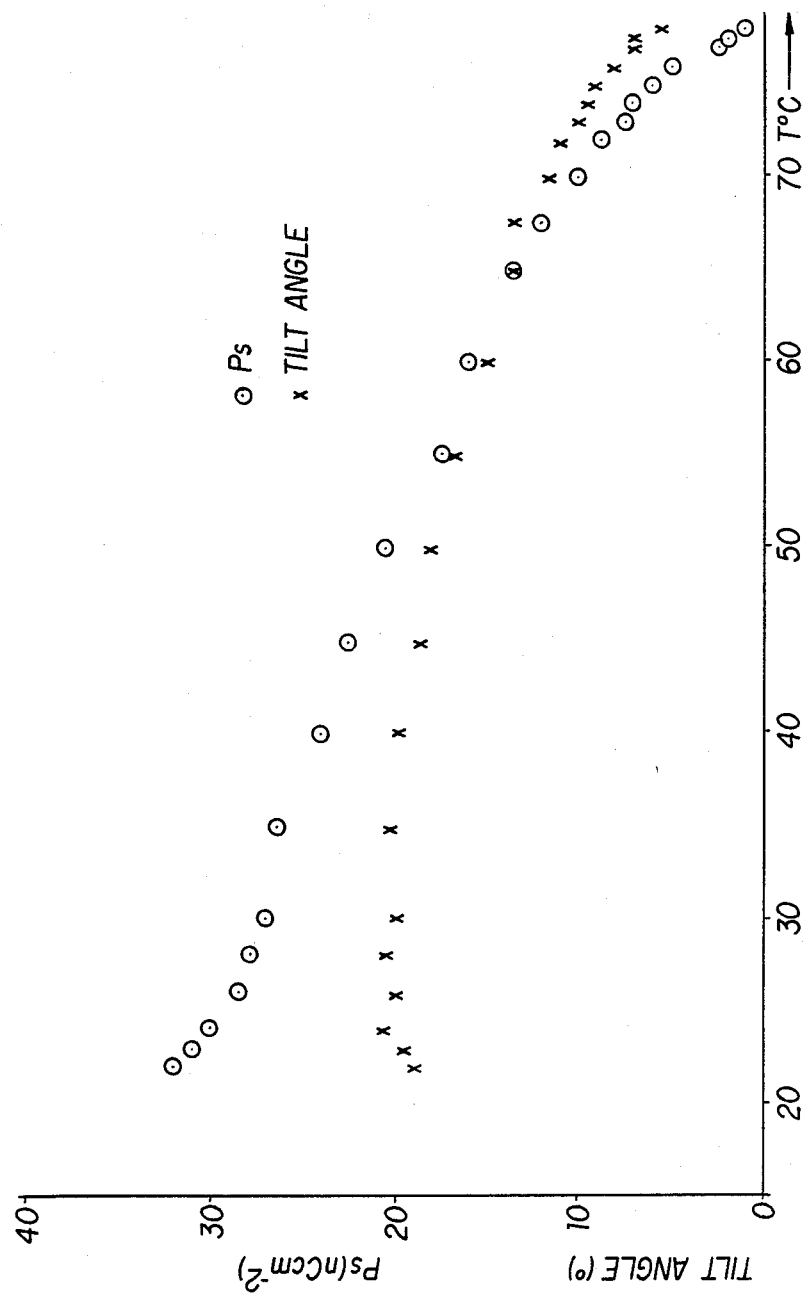
FIGS. 7 & 8 show graphs of Ps and tilt angle against temperature for two ferroelectric smectic mixtures.

The variation of Ps and tilt angle for this mixture are shown in FIG. 7.

Example 4

Host: a 1:1:1 by weight mixture of components (a) and (b) of the host of Example 3, and

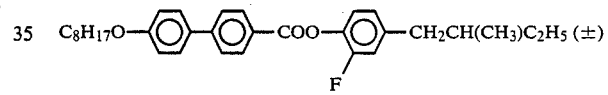

(racemic mixture)

Dopant: the same compound as used in Example 3, as a 10 wt% solution in the host.

The mixture of Example 4 showed the following liquid crystal transition:

S?25′S$_C$97.3S$_A$110.2Ch140′I

Figure 8:
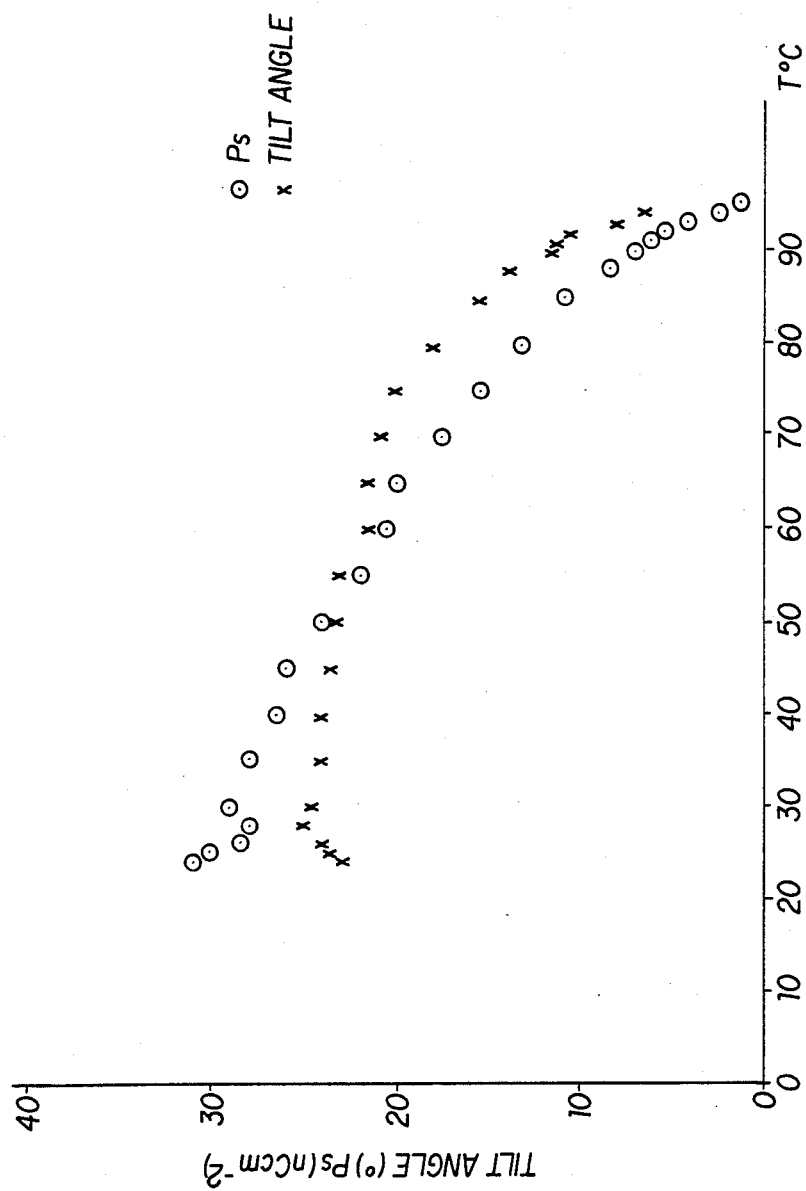

The variation of Ps and tilt angle with temperature of this mixture are shown in FIG. 8

Note. Liquid crystal transitions denoted were measured by DSC.

The properties of some more compounds of the invention, and the relevant preparative routes are given in Table 6.

TABLE 6

| Compound | C-I | S$_A$-I | $[\alpha]_D^{24}$ | Ps* | $\mu_{eff}$* | Tilt* Angle | Sense of* Pol. | Prep. route. |
|---|---|---|---|---|---|---|---|---|
|  | 45.5 | | +42.3 | | | No S$_C$* phase in 10 mole % mixture. | | (A) |
|  | 96.0 | | +64.2 | 199 | 0.62 | ca 16° | (−) | (A) |

TABLE 6-continued

| Compound | C-I | S$_A$-I | $[\alpha]_D^{24}$ | Ps* | $\mu_{eff}$* | Tilt* Angle | Sense of* Pol. | Prep. route. |
|---|---|---|---|---|---|---|---|---|
| C$_8$H$_{17}$O—[Ph—L]$_2$—Ph—CO$_2$CA | 65.0 | | | 172 | 0.59 | 13.5° | (—) | (A) |
| C$_8$H$_{17}$O—[Ph—L]$_2$—CA | 42.0 | (21) | | 73 | 0.20 | 13.5° | (—) | (A) |
| C$_8$H$_{17}$O—[Ph—L]$_2$—L—Et | 47.0 | | | 105 | 0.25 | 15° | (—) | (B) |
| C$_8$H$_{17}$O—Ph—L—Ph—L—Et | 31.0 | | | | | | | (A) |
| C$_8$H$_{17}$O—Ph—L—Ph—L—Et | 20.0 | | | No S$_C$* phase in 10 mole % mixture. | | | | (A) |
| C$_8$H$_{17}$O—Ph—Ph—L—Ph—L—Et | 58.5 | | | 135 | 0.42 | 14° | (—) | (A) |
| C$_8$H$_{17}$O—Ph—Ph—L—(chiral) | 44 | | +17.0 | 120 | 0.33 | 15° | (—) | (A) |

*Measured in racemic CE8 Host. (10 mole %)

An example of the use of a compound of Formula 8 in a liquid crystal material and device embodying the present invention will now be described with reference to the accompanying drawing, FIG. 9 which is a cross sectional end view of a liquid crystal shutter.

Figure 9:
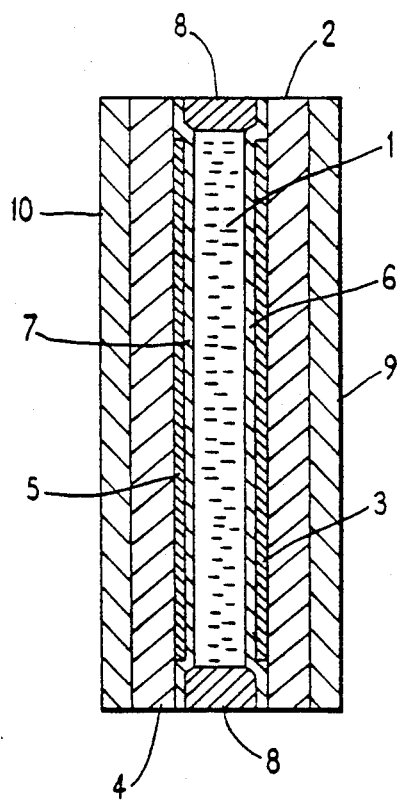
FIG. 9 shows a cross section through a liquid crystal device of the invention.

In FIG. 9 a liquid crystal cell comprises a layer 1 of liquid crystal material exhibiting a chiral smectic phase sandwiched between a glass slide 2 having a transparent conducting layer 3 on its surface, eg of tin oxide or indium oxide, and a glass slide 4 having a transparent conducting layer 5 on its surface. The slides 2,4 bearing the layers 3, 5 are respectively coated by films 6, 7 of a polyimide polymer. Prior to construction of the cell the films 6 and 7 are rubbed with a soft tissue in a given direction the rubbing directions being arranged parallel upon construction of the cell. A spacer 8 eg of polymethylmethacrylate, separates the slides 2, 4 to the required distance, eg 5 microns. The liquid crystal material 1 is introduced between the slices 2,4 by filling the space between the slides 2, 4 and spacer 8 and sealing the spacer 8 in a vacuum in a known way.

A suitable liquid crystal composition for the material 1 is as follows:

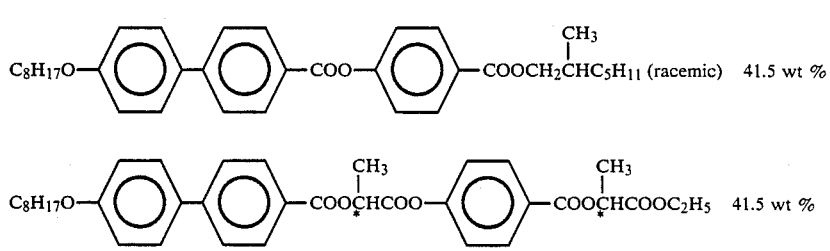

-continued

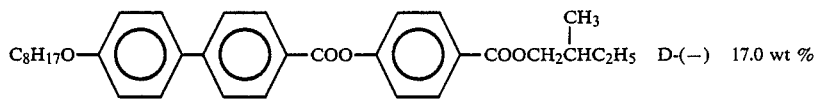

An alternative mixture is:

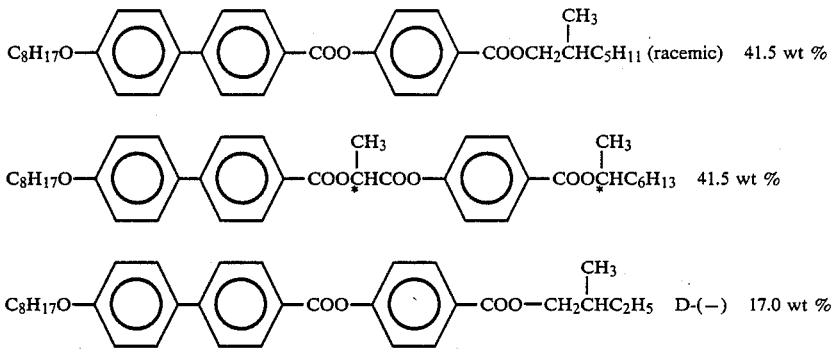

A polarizer 9 is arranged with its polarization axis parallel to the rubbing direction on the films 6, 7 and an analyzer (crossed polarizer) 10 is arranged with its polarization axis perpendicular to that rubbing direction.

When a square wave voltage (from a conventional source not shown) varying between about +10 volts and −10 volts is applied across the cell by making contact with the layers 3 and 5 the cell is rapidly switched upon the change in sign of the voltage between a dark state and a light state as explained above.

In an alternative device (not shown) based on the cell construction shown in FIG. 9 the layers 3 and 5 may be selectively shaped in a known way, eg by photoetching or deposition through a mask, eg to provide one or more display symbols, eg letters, numerals, words or graphics and the like as conventionally seen on displays. The electrode portions formed thereby may be addressed in a variety of ways which include multiplexed operation.

We claim:

1. A compound suitable for use in a ferroelectric smectic liquid crystal composition having a structure which contains two chiral centers derived from alpha-hydroxy carboxylic acid groups and having the formula:

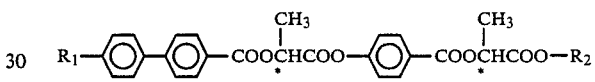

wherein $R_1$ is n-alkoxy containing from 1 to 12 carbons atoms and $R_2$ is n-alkyl containing from 1 to 12 carbons atoms.

2. A compound as claimed in claim 1 wherein $R_1$ contains from 5 to 12 carbon atoms.

3. A compound as claimed in claim 14 wherein $R_1$ is n-$C_8H_{17}O$.

4. A compound as claimed in claim 1, 2 or 3 wherein $R_2$ contains from 1 to 5 carbon atoms.

5. A compound as claimed in claim 4 wherein $R_2$ is ethyl.

6. A ferroelectric liquid crystal composition which is a mixture of compounds at least one of which is a compound as claimed in claim 1.

* * * * *